United States Patent [19]

Deuchemin

[11] Patent Number: 4,978,065
[45] Date of Patent: Dec. 18, 1990

[54] METHOD AND APPARATUS FOR ATTACHING A RAIL USING PLASTICALLY DEFORMABLE METAL SPIKES AND METAL SPIKES PER SE

[75] Inventor: Michel Deuchemin, Cambrai, France

[73] Assignee: Allevard Industries S.A., Meylan, France

[21] Appl. No.: 354,275

[22] Filed: May 19, 1989

[30] Foreign Application Priority Data

May 26, 1988 [FR] France ................................ 88 07037

[51] Int. Cl.⁵ ............................................... E01B 9/28
[52] U.S. Cl. ..................................... 238/366; 238/338; 238/349
[58] Field of Search ............... 238/349, 315, 323, 338, 238/343, 344, 345, 350, 351, 366, 368, 367, 370, 375, 377

[56] References Cited

U.S. PATENT DOCUMENTS

| 1,012,152 | 12/1911 | Pollard | 238/368 |
| 1,016,690 | 2/1912 | Hyle | 238/366 |
| 2,195,038 | 3/1940 | Ruping | 238/366 |
| 4,274,582 | 6/1981 | Fee | 238/349 |
| 4,470,543 | 9/1984 | Gray et al. | 238/349 |

FOREIGN PATENT DOCUMENTS

| 516030 | 12/1952 | Belgium | 238/351 |
| 1180765 | 12/1954 | Fed. Rep. of Germany | 238/351 |
| 845938 | 9/1939 | France | |
| 761893 | 11/1956 | United Kingdom | 238/349 |
| 781548 | 8/1957 | United Kingdom | 238/349 |
| 926367 | 5/1963 | United Kingdom | |

Primary Examiner—Robert P. Olszewski
Assistant Examiner—Mark T. Le
Attorney, Agent, or Firm—Mason, Fenwick & Lawrence

[57] ABSTRACT

A method of fixing a rail on a rail-support by metal spikes each comprising a round shaft having a top and terminated by a head for bearing against a rail flange with at least the bottom portion of the spike shaft being received in the rail-support in such a manner that the spike head is directed away from the rail-supporting surface of the rail-support. The bottom portion of the shaft includes at least one zone made of a plastically deformed material, and an antirotation structure is provided co-operating with complementary parts of the rail support for preventing any rotation of the bottom portion of the spike relative to the rail support when a couple below a predetermined value is applied to the top portion of the spike. The bottom portion of the shaft is placed in the rail support, the rail is placed on the rail support in the position in which it is to be fixed, and then a sufficient twisting couple is applied to the plastically deformable zone of the spike by twisting the top portion of the spike to bring the head over and bearing against the rail flange by plastic deformation in the plastically deformable zone.

28 Claims, 6 Drawing Sheets

METHOD AND APPARATUS FOR ATTACHING A RAIL USING PLASTICALLY DEFORMABLE METAL SPIKES AND METAL SPIKES PER SE

BACKGROUND OF THE INVENTION

The present invention relates to a method and apparatus for fixing a rail on a rail-support by using metal spikes which are plastically deformable in torsion or in bending, and to such a metal spike, per se.

Many railroads comprise a pair of rails fixed on wooden ties. A metal sole plate is often interposed between each rail and the ties in order to improve transmission of loads and lateral forces due to trains passing along the rails.

Forged steel spikes or bolts are engaged in the tie on either side of the rail flange, optionally through holes formed in the sole plates. The heads of the spikes or bolts partially overlie the rail flange in order to prevent the rail from lifting or overturning.

The attaching is completed by anticreepers fixed to the rails and to abutments against the ties in order to prevent the rails from sliding longitudinally relative to the ties.

When a worn rail is replaced, it is necessary to extract the bolts or spikes from their holes in the ties, thereby enlarging the holes and damaging the ties. A hole which is excessively damaged cannot be reused and becomes a starting point for rot. If there are not enough spikes or bolts in ties that are in good condition, then there is a danger of derailing.

When tracks are laid, the rails do not bear simultaneously on all of the ties. The resulting clearances are not taken up by the spikes being put into place.

Even when using bolts, rails are not clamped sufficiently uniformly to enable long welded rails to be used which are so advantageous for good track performance. To make that possible, it is necessary to use a resilient attachment comprising a resilient sole plate compressed beneath the flange of the rail by a spring bearing against the top of the flange. Instead of using a spike with a flexible head as the spring, since that prevents rails from being replaced, it is generally preferred to use a resilient fastening which is put under tension by tightening a bolt or by being engaged in a housing of a special sole plate fixed to the tie by independent spikes or bolts. Resilient fastenings allow rails to be replaced without damaging the mounting; however only screw mountings are suitable for adjusting clamping and optionally for subsequent further tightening.

Concrete supports are stiffer than wooden ties. Spikes can be engaged therein. They require a mounting which is more flexible and which necessarily includes a resilient sole plate, with fastenings and lateral abutments interposed between the rail and its support. They are not sufficiently insulating and the mounting must contribute to insulating the rail electrically.

The use of long welded rails is highly recommended for ensuring that shocks at joins between rails do not destroy the adjacent supports. However long welded rails require very uniform clamping in order to prevent buckling due to thermal expansion. All of these conditions can be satisfied by adding additional parts: bolts; washers; insulating spacers; resilient chairs; etc.

Anticreepers are not required when attaching by means of resilient fastenings, whether the attaching is on to wood or on to concrete. However, a large number of parts is always required for assembly on the track. This makes such fastening more expensive and more difficult to perform correctly, whereas it is desirable to reduce the number of parts that need assembling in order to simplify laying so as to make it suitable for mechanization.

A document representative of the state of the art in attaching or fixing systems using spikes is constituted by U.S. Pat. No. 2,869,792. Column 2 lines 22 to 28 thereof describe the possibility of withdrawing spikes only partially and of pivoting them in order to allow a rail to be replaced, with this being made possible by the fact that the bottom portion of each spike is capable of rotating about itself. This constitutes a solution which is difficult to apply in practice since once a rail has been replaced for the first time, it is very difficult, if not practically impossible, to adjust the clamping force or to provide for subsequent reclamping.

Another document is constituted by U.S. Pat. No. 2,195,038 which attempts to solve the problem of providing a fixing system including spikes initially inserted on either side of the rails, i.e. enabling a rail to be laid prior to the spikes being fully inserted into the clamping position, after which, as it is engaged progressively, each spike rotates through 90° in order to take up a clamping position as shown in the righthand sides of FIGS. 1 to 3. This is made possible either by providing the spikes with twisted bodies thus causing them to pivot as they are driven into the support or tie (FIG. 1), or else by providing a cylindrical bottom portion (FIG. 3) making rotation easy.

It will be understood that according to this document, it is indeed possible to pivot the spike from a side position enabling a rail to be put into place to a clamping position, however the major drawback lies in the fact that since such rotation of the spike is easy, the mounting is not reliable and too often trains transmit forces to the rails which cause such spikes to pivot so that they no longer exert sufficient clamping, and in particular the resistance of the rail to overturning is reduced. This is therefore unacceptable.

The object of the present invention is therefore to solve the novel technical problem consisting in providing a fixing system using one-piece spikes which are permanently fixed to the rail support and which simultaneously make it possible to unclamp, remove, and replace a rail, after which the rail is reclamped, and preferably making such operations possible on several occasions without running the risk of the spike rotating in its support when in use. Preferably, this solution should be particularly simple in design so that the fixing method is easy and can be performed by a worker with ordinary qualifications.

The present invention also makes it possible to replace spikes, should that be necessary, and to provide lateral abutment for a rail, when required.

The present invention solves this technical problem for the first time in a manner which is satisfactory, and it can be used on an industrial scale.

SUMMARY OF THE INVENTION

In a first aspect, the present invention provides a method of fixing a rail on a rail-support by means of metal spikes each comprising a round shaft having a top end terminated by a head for bearing against a rail flange with at least the bottom portion of said spike shaft being received in the rail-support in such a manner that the spike head is directed away from the rail-supporting surface of the rail-support. The rail is placed on its support in the position in which it is to be fixed and the spike is caused to rotate in such a manner that the head of the spike overlies the top of the rail flange and is caused to bear against the rail flange. Said bottom portion of the shaft includes at least one zone made of a plastically deformable material, and antirotation means are provided co-operating with complementary means of the rail support for preventing any relative rotation of said bottom portion relative to the rail support, when a couple below a predetermined value is applied to the top portion of the spike. After said bottom portion of the shaft has been received in the rail support, a sufficient twisting couple is applied to said plastically deformable zone via the top portion of the spike to bring said head over the rail flange by plastic deformation in said zone.

In a first implementation, the remainder of the spike outside said zone may be made to be less deformable, being made of a material, generally a metal, which is harder, or being of greater cross-section in order to obtain a different section modulus.

The above-mentioned plastically deformable zone is made in the bottom portion and lies inside the support after the spike has been engaged therein.

In a particularly advantageous implementation of the method of the invention, the spike is thrust in until its head bears against the rail support or on a sole plate interposed between the support and the rail, such that the subsequently applied twisting couple forces the head to rise onto the sloping top face of the rail flange.

In another particular embodiment, the above-mentioned plastically deformable zone is obtained by having a different degree of hardness from the remainder of the spike.

The spike is made of a metal which is sufficiently malleable for plastic deformation to be repeatable without breaking for a number of occasions which is easily compatible with the conditions under which a tie is used. A suitably treated, lightly-alloyed or carbon steel may be used. The spike may be made of spring steel and the above-mentioned plastically deformable zone may be obtained by applying a heat treatment thereto different from that given to the remainder of the spike.

In another embodiment, the shaft of the spike is toroidal and is fitted in a hollow sheath in the form of an arc of a torus having the same radius as said shaft. The assembly is received in the rail support and projects out therefrom through the top face of said support, close to the rail, after which rotary bending is applied to said shaft by rotating the head of the spike.

This serves to fix the spike in the rail support.

The same movement may subsequently be used for clamping to the rail, for adjusting its degree of clamping, and for releasing the rail, as often as may be desired.

The heat treatment applied to the shaft of the spike of the invention can then be the same as the treatment applied to its head. The rotary bending of the spike shaft takes place inside the hollow sheath received in the rail support whose shape in the form of a large radius toroidal arc or circular arc opens out in the top face of the support. The outside shape of the sheath depends above all on the type of rail support.

If the support is made of concrete, then the sheath may be embedded in the concrete. There will be no harm in it being tubular in shape. If necessary, it may open out both in the top face and in the bottom face thereof. This possibility is not limiting. A sheath whose external shape is cylindrical, of round or oblong section may be used with most supports.

It is then thrust into a housing of corresponding shape in the rail support together with the spike shaft that it contains.

When rotation is achieved by applying a twisting couple to the head of the spike, then its shaft bends in the plane of the cavity. By continuing to rotate the head, the orientation of the bending changes continuously relative thereto. This provides rotary bending. After the head has been turned through one-fourth of a turn or more, its deformed shaft is pressed against the walls of the sheath in four directions.

The elasticity of the shaft maintains this pressure after the couple that gave rise to the rotation has been removed.

However, the spike does not return to its initial shape. The plastic deformation acquired by the shaft remains. Friction forces due to pressure contribute to maintaining the spike in its new position.

When traction is exerted on the spike, the friction forces which resist extraction thereof are quite sufficient for rail fixing. However, if necessary, the spike can be extracted from the cavity of the sheath by exerting a very much larger force thereon, e.g. in traction.

The pressure exerted by the shaft in a sheath of plastic material is transmitted to the periphery of the sheath. The resulting friction forces retain the sheath in its housing.

The radius of curvature of the shaft and thus of the corresponding cavity in the sheath is selected in such a manner that the torsion stresses on the shaft remain within the elastic region whereas the bending stresses may go into the plastic region. The pressure, and thus the friction forces between the shaft and the sheath, increase with increasing elastic limit of the metal.

Before a rail is laid, the heads of the fixing spikes on either side of the rail are directed in opposite directions so as to leave a space therebetween for receiving the rail. Once the rail has been suitably positioned, pressing against lateral abutments, the spike heads are rotated in order to press their lugs onto the top of the rail flange. The degree of clamping can be adjusted by causing the lugs to move to a greater or lesser extent over the slope of the rail flange. In operation, by virtue of the shaft bending and by virtue of friction forces between the shaft and the sheath, the head of the spike retains the orientation which is imparted thereto and thus maintains pressure on the rail flange.

When the rail is to be removed, the spike heads are again rotated, thereby disengaging the rail.

In a second aspect, the present invention also provides a system for fixing a rail on a rail-support by means of metal spikes each comprising a round shaft whose top portion is terminated by a head for bearing against a rail flange, wherein the bottom portion of the shaft of said spike includes at least one zone made of a plastically deformable material and anti-rotation means co-operating with complementary means in the rail support in order to prevent any relative rotation between said bottom portion and said rail support, at least up to a certain couple.

In a first embodiment, the remainder of the spike may be made to be less deformable, with the spike material which is generally a metal being harder or of greater cross-section in order to obtain a different section modulus.

The above-mentioned zone made of a plastically deformable material is situated in the bottom portion located inside the support after the spike has been engaged therein.

In a particular embodiment, the above-specified plastically deformable zone is defined by a smaller right cross-section or a smaller diameter of the shaft relative to the remainder of the spike which preferably comprises the top portion thereof. Advantageously, a separation enlargement is provided between the top portion of the shaft and said zone of smaller right cross-section.

In a particular embodiment, the head of the spike includes a wide lug which spreads the pressure over a relatively large area of the rail flange.

In another particular embodiment, the top portion of the spike includes a helical slope of variable pitch running coaxially with the shaft.

The spike may be made of a material as defined above for the method, and the criteria for choosing a given material are well known to the person skilled in the art.

In a third aspect, the present invention also provides a spike for implementing the above-defined method or as an essential item in the above-defined fixing system, the spike being as defined in the above description or in the following description made with reference to the accompanying drawings which form an integral part of the invention and therefore an integral part of the present description.

It will thus be understood that a spike of the invention is fixed permanently to the rail support while still enabling a rail to be unclamped, removed and replaced, with the new rail then being clamped thereby. This spike comprises a single part which is particularly simple in design and therefore cheap. By virtue of the zone made of plastically deformable material, the head of the spike can be pointed at will in any direction by applying a large twisting couple. By virtue of this rotation made possible by plastic torsion of the plastically deformable zone of the spike, the head can be moved away from the rail at will in order to disengage the rail or replace the rail, or the head may be positioned at a selected level on the inclined slope constituted by the top face of the rail flange. The rail can thus be clamped with a desired force as a function of the selected spike position.

In one embodiment of the invention, the above-mentioned means for preventing the bottom portions of spike shafts from rotating and the complementary means in the rail support are constituted by the shaft being folded or curved.

In yet another aspect of the invention, the fixing system comprises spikes having round shafts received in sheaths embedded in said support and opening out in the top face of the support close to the rail, said sheaths and the cavities therein in which the shafts are received being curved with a same-radius circular arc.

In a particular embodiment, said spike is fixed in said sheath cavity by rotary bending of its shaft due to rotation of its head.

Said sheath cavity opens out into the top face of the rail support and said sheath preferably projects beyond the support so as to constitute a lateral abutment for the rail.

When the sheath is embedded in the rail support, a degree of clearance is provided relative to the spike shaft in order to make it easily engageable in the cavity of the sheath.

However, when its outside surface is cylindrical, the sheath may be fitted with the spike prior to being thrust into its housing. The clearance between the shaft and the sheath may then be zero. Rotation of the sheath may be prevented either by an oblong section or else by a non-circular collar.

The portion of the sheath which projects from its housing in the rail support may be shaped in such a manner as to be capable of acting as a lateral abutment for the rail.

It may be sufficiently flexible to follow rail movements and to be forced to do so by the head of the spike or by a tongue engaged beneath the rail.

However, this abutment maintains the rail laterally in position with firmness by virtue of the sheath being embedded in the rail support and by virtue of its being reinforced by the spike.

The spike of the invention generally includes a flexible head comprising, for example, a flattened lug having a wide thrust area on the rail flange. It may be ensured that a portion of the lug bears simultaneously on the lateral abutment in order to maintain it at a constant level relative to the rail.

Since rotary bending of the shaft makes it possible to change the direction of the head, a wider degree of freedom is provided in selecting the direction in which the sheath extends within the rail support, and thus in the design thereof. All that is required is that the cavity in the sheath opens out perpendicularly to the thrust surface of the rail so that identical spikes can be used in sheaths having different orientations.

The metal sole plates used for laying rails on wooden ties are often provided with square holes through which spikes are thrust. In this case, it is advantageous to use a sheath whose outside shape where thrust into the wood is a circular cylinder. It is surmounted by a square collar which fits exactly in a square hole in the sole plate. The collar prevents the sheath from rotating when the spike is twisted.

It will thus be understood that all of the important technical advantages mentioned above are, in fact, obtained, as are those which are clear to the person skilled in the art.

BRIEF DESCRIPTION OF THE DRAWINGS

Embodiments of the invention are described by way of example with reference to the accompanying drawings, in which.

DETAILED DESCRIPTION

Figure 1:
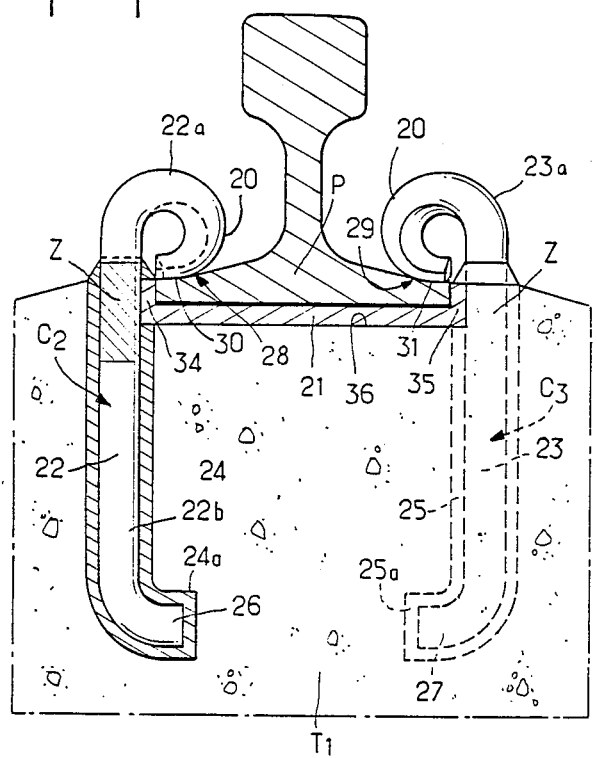
FIG. 1 is a cross-section through one embodiment of a fixing system in accordance with the invention and specifically adapted to concrete ties, although not limited to ties of this type.

One embodiment of spikes C, $C_1$ in accordance with the invention is shown in FIGS. 1 to 4. This embodiment is particularly suitable for supports or ties $T_1$ made of concrete, but it is not limited to this particular support material. In this case, a resilient sole plate 21 is advantageously interposed between the rail R and its support $T_1$ made of conventionally reinforced concrete.

In this embodiment, the shafts 22 and 23 of spikes $C_2$ and $C_3$ are received in sleeves 24 and 25 which are embedded in the tie $T_1$ during casting thereof, each having a bottom portion 24a or 25a which is curved, and preferably in a direction which is substantially perpendicular to the general direction of the rail R. It will be understood that the shafts 22 and 23 are simply disposed inside the sleeves 24 and 25 with their ends constituting curved tails 26 and 27, with the curved portions 24a and 25a and 26 and 27 then constituting the above-mentioned antirotation means.

In addition, in this embodiment, the heads 28 and 29 are flattened out progressively and are wound over to form lugs 30 and 31 which join the corresponding shafts 22 and 23 via curved portions constituting loops. Each lug 30 or 31 bears against the top of a rail flange P.

Figure 4:
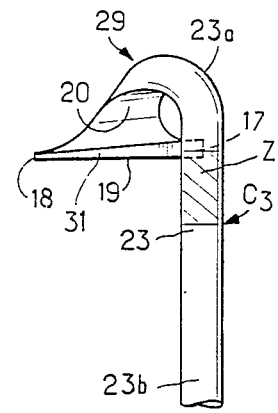
FIG. 4 is a profile view of the spike ($C_3$) of the invention as shown in FIGS. 1 to 3.

The structure of the spikes $C_2$ and $C_3$ is described in greater detail with reference to FIG. 4 which shows the spike $C_3$. The progressively flattened head 29 of the spike $C_3$ is wound to form the lug 31 and joins the shaft 23 via a portion which is bent to form a loop. The lug 31 is excentric and its end 17 closest to the shaft 23 is thicker than its opposite end 18 at a distance therefrom. Its bottom face 19 for bearing against the rail flange P is advantageously joined to the outside surface of the shaft 23 via a loop 20.

Advantageously, the face 19 is slightly inclined such that the end 18 is disposed at a lower level than the end 17. In an advantageous embodiment, this shaft 23 is made of spring steel and the top portion 23a is hardened by heat treatment while the bottom portion 23b is, on the contrary, in the annealed state so as to define the above-mentioned zone Z made of plastically deformable material. The resilient sole plate 21 has guides 34 and 35 for providing lateral positioning of the rail flange P. The resilient sole plate 21 is itself held in a groove 36 in the tie-forming support $T_1$ by the sleeves 24 and 25 which project above the guides 34 and 35.

It is advantageous, in practice, for the sleeves 24 and 25 to be embedded together with the spikes $C_2$ and $C_3$ in the tie-forming support $T_1$ while the support is being molded or cast.

Figure 2:
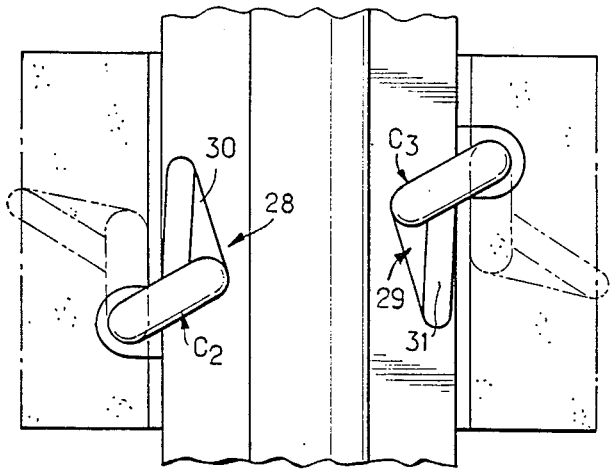
FIG. 2 is a plan view of the fixing system of FIG. 1 with dot-dashed lines showing the position of the spike prior to clamping and solid lines showing its position after an appropriate twisting couple has been applied to the head of the spike to cause it to bear against the rail flange.

Thus, seen from above, the tie $T_1$ appears as shown in dot-dashed lines in FIG. 2. On either side of the sole plate 21, spikes $C_2$ and $C_3$ are embedded in the tie $T_1$ and have their heads 28 and 29 running parallel to the rail R, with their lugs 30 and 31 pointing outwards.

When the track is laid, the ties $T_1$ are placed parallel to one another at uniform spacing, with their grooves 36 in alignment. The rails are then moved into position and, guided by the heads 28 and 29 of the spikes $C_2$ and $C_3$, they are placed between the guides 34 and 35.

A twisting couple is then applied of sufficient value to plastically deform the shafts 22 and 23 in their zones Z of plastically deformable material by applying said twisting couple to the visible top portions 22a and 23a of the shafts 22 and 23 of the spikes $C_2$ and $C_3$. The tails 26 and 27 thereof which are embedded in the reinforced concrete inside the curved portions 24a and 25a of the sleeves 24 and 25 cannot be deformed therein. The plastic torsion which is facilitated by the sleeves 24 and 25 does not alter either the length or the outside shape of the shafts, but only the orientation of the heads 28 and 29 relative to the tails 26 and 27. This twisting brings the heads 28 and 29 over the rail flange P to occupy the position shown in solid lines in FIG. 2.

During this motion, the looped portion 20 of the spikes $C_2$ and $C_3$ initially makes contact with the edge of the rail flange and slides thereover ahead of the corresponding lug 30 or 31, thereby facilitating application thereof. By continuing the twisting force, the head 28 or 29 is bent and twisted until all slack is taken up and full contact is achieved between the lug 30 or 31 and the rail flange P. The twisting couple is then removed. The lug 30 or 31 then moves back a little, but it has been subjected to preshaping which adapts it to local conditions. The end of the lug 30 or 31 which is very stiff, remains on the edge of the rail flange and conserves the level reached. The remainder of the lug 30 or 31 moves down a little along the slope of the rail flange P, but it retains the major portion of its elastic deformation, thereby imparting the desired clamping force on the rail.

The preshaping achieved in this way guarantees the spike against any danger of subsequent accidental plastic deformation. The force exerted at its point of application against the rail can only be modified by means of an external action which is at least as powerful as that used for preshaping.

When a train goes past, the resilient sole plate 21 is compressed, however the lugs 30 and 31 still remain in contact with the rail flange P and they maintain a substantially constant force. The rail which is subjected to transverse forces is held between the guides 34 and 35 and is securely prevented from overturning by the stiff ends of the lugs 30 and 31.

Subsequently, when necessary, it remains possible to tighten rail clamping by causing the lug 30 or 31 to rise up the rail flange by further twisting the shaft 22 or 23, or on the contrary, the rail R may be completely released by twisting the shaft 22 and 23 in the opposite direction using a sufficient couple to return the lugs 30 and 31 to the positions shown in dot-dashed lines in FIG. 2 where they are parallel to the rail.

Figure 3:
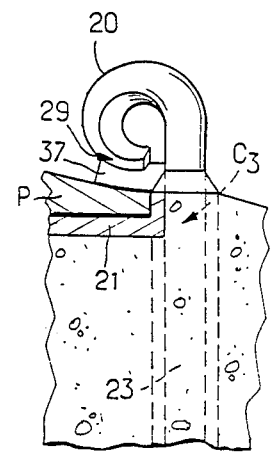
FIG. 3 shows a variant embodiment of the spike shown in FIG. 1 where an insulating element is interposed between the head of the spike and the rail flange.

It is easy to insulate the rail electrically by ensuring that the sleeves 24 and 25 are electrically insulating. If additional electrical insulation is required, then it may be provided (as shown in FIG. 3) by interposing an intermediate electrically insulating item 37 between the lug 30 or 31 and the rail flange P.

Figure 5:
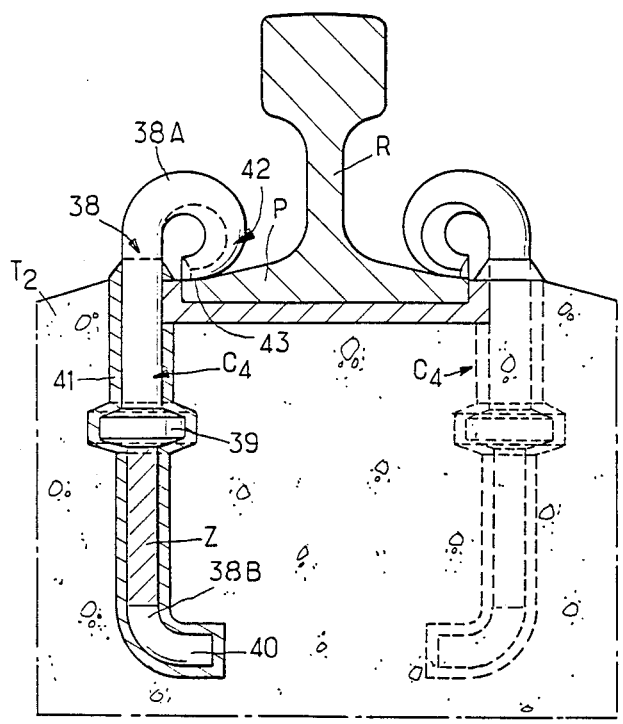
FIG. 5 shows another embodiment of a spike in accordance with the invention.

In a variant spike $C_4$ as shown in FIG. 5, the shaft 38 includes an enlargement 39 of circular shape disposed coaxially with the shaft 38 and it has a curved tail 40 in its bottom half 38b, thereby providing the antirotation means. Between the enlargement 39 and the tail 40, the zone Z which is coaxial with the shaft 38 and the enlargement 39 is of reduced hardness, or preferably of smaller diameter than the shaft 38. The shaft 38, the enlargement 39, the zone Z, and the tail 40 are all enclosed in a sleeve 41 which is complementary in shape. The sleeve 41 is embedded in the rail support $T_2$.

Any couple of sufficient value applied to the top portion 38a of the spike causes the zone Z to be twisted plastically, while the remainder of the spike remains under elastic conditions. The zone Z, the enlargement 39, and the shaft 38 rotate without difficulty inside the sleeve 41 held in the support $T_2$.

When the head 42 of the top part 38a has its lug 43 clamped against the rail flange P, it is the enlargement 39 which resists the traction force transmitted by the shaft 38 without any danger of creep since there is nothing to stop it being as large and as strong as desired. The zone Z is not subjected to the traction stresses, and may therefore be very deformable, if necessary.

Figure 6:
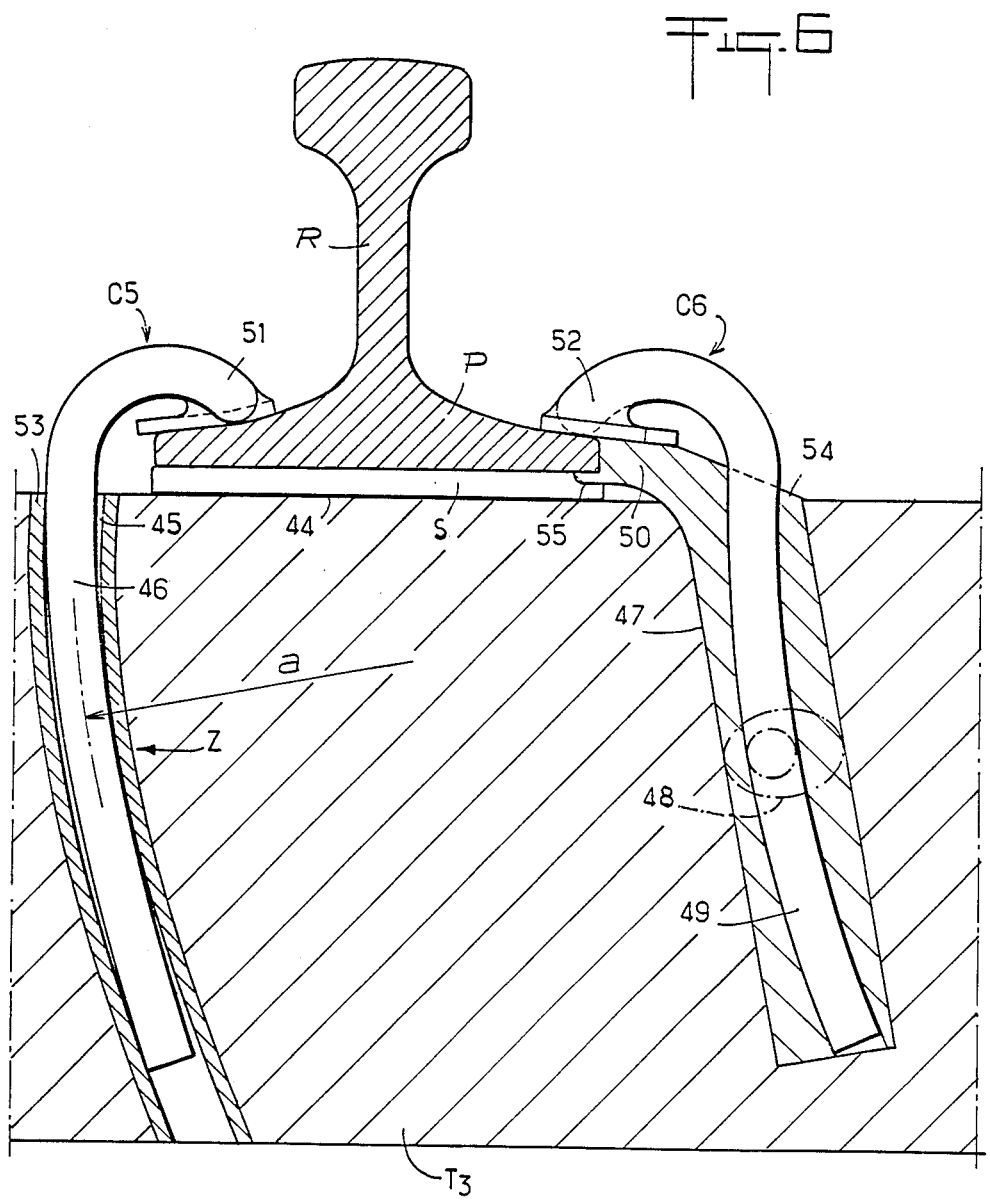
FIG. 6 is a cross-section through another implementation of a fixing system in accordance with the invention.

In the embodiment shown in FIG. 6, the rail R is fixed on its support $T_3$ by spikes $C_5$ and $C_6$ which are received in sheaths 53 and 54 inserted in the support $T_3$.

The spike $C_5$ and its sheath 53 are installed close to the rail flange P on the inside of the railroad. The spike $C_6$ and its sheath 54 are installed on the outside of the railroad.

The sheath 53 is embedded in the support $T_3$ of the rail R. Its cavity 45 is in the form of an arc of a torus of circular or slightly oblong section and is a little larger than the round cross-section of the shaft 46 of the spike $C_5$. This shaft is curved to occupy an arc of a torus having the same radius as the cavity 45.

The outside surface 47 of the sheath 54 is a cylinder of oblong cross-section 48. Its cavity has the same shape as an arc of a torus as does the shaft 49 of the spike $C_6$ enclosed therein. At its top portion projecting out from the support $T_3$, the sheath extends in the form of a lateral abutment 50 for the rail flange P.

Each of the spikes $C_5$ and $C_6$ has a flexible head 51 or 52.

Figure 7:
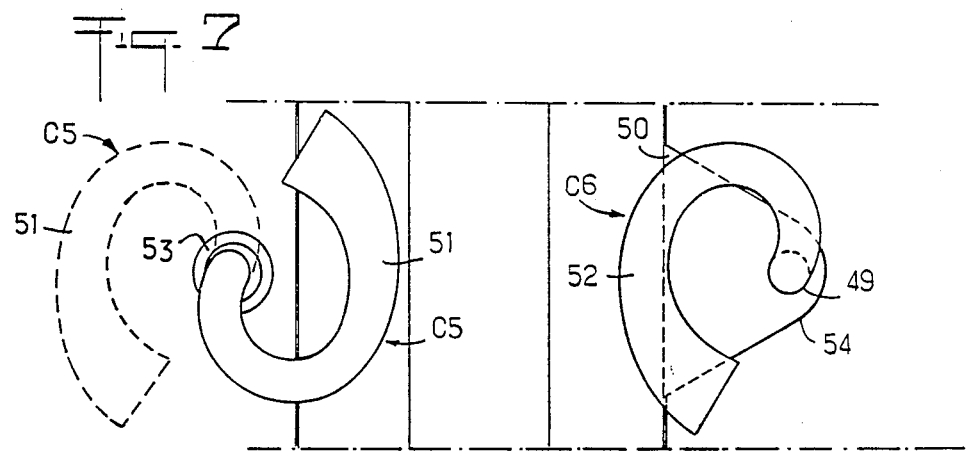
FIG. 7 shows the system of FIG. 6 in plan view with dotted lines representing a spike at a different orientation.

Prior to the rail R being put into place on its support $T_3$, the shaft 49 of the spike $C_6$ is inserted in the sheath 54 and then the shaft and sheath assembly is thrust into the support $T_3$ with the head 52 pointing away from the rail R. The sheath 53 is embedded in the support $T_3$ while it is being cast. Prior to the rail R being put into place, the spike $C_5$ is thrust into the sheath 53 with its head pointing away from the rail, in the position shown in dashed lines in FIG. 7.

A resilient sole plate S is placed on the table 44 of the rail support $T_3$ between the spikes $C_5$ and $C_6$. The rail is placed on the sole plate S and against the abutment 50. A twisting couple is applied to each of the heads 51 and 52, thereby rotating them over the rail flange P to take up the position shown in solid lines in FIG. 7, by virtue of rotary bending of the shafts 46 and 49 inside their respective sheaths 53 and 54. It appears that the shape of each shaft 46 and 49 remain unaltered, with only the direction in which the head is pointing being changed.

By virtue of the clearance existing in the cavity 45, the shaft 46 is deformed in zone Z.

In the plane of FIG. 6, its curvature is reversed and the shaft is curved laterally by passing through intermediate orientations.

The forces which produce these deformations act on the two ends of the shaft 46 and on its middle, in the plane of FIG. 6 and in a direction perpendicular thereto. Because of the elasticity of the shaft 46, all of these forces remain after the deformation-producing couple is removed, and in the form of pressure between the shaft 46 and the sheath 53. Large friction forces are generated at each of the pressure points, thereby hindering subsequent rotation of the shaft 46 and also hindering its extraction from the sheath 53 when the spike $C_5$ is pulled. This therefore defines the antirotation means for co-operating with complementary antirotation means in the support $T_3$ constituted by the toroidal shape of the cavity corresponding to the sheath used. However, these friction forces can be overcome by exerting a high value couple or traction force. The same pressure points exist and have the same effects between the shaft 49 and the sheath 54, and when the sheath is made of plastic material, between the sheath 54 and the support $T_3$.

By virtue of the elasticity of the heads 51 and 52 of the spikes $C_5$ and $C_6$, the bending to which they are subjected on rising over the rail flange P imparts forces to them which retain them on the rail flanges P since said forces are well below those required for overcoming the friction forces between the shafts 46 or 49 and the corresponding sheaths 53 or 54.

By virtue of the slope of the rail flange P, it is possible to adjust the clamping force on the rail by moving the spike head 51 and 52 thereover to a greater or lesser extent.

In operation, the rail is subjected to vibration, but it is maintained constantly clamped between the resilient sole plate S and the spikes $C_5$ and $C_6$ by virtue of their elasticity. The abutment 50 remains pressed against the rail flange P. It is sufficiently resilient to accompany the vertical motion of the rail without giving rise to relatively displacement and thus to wear. To this end, it is advantageous to cause the rail flange P to project beyond a portion of the head 52 so as to bear against the abutment 50 when the rail R is loaded and moves down a little. It is also possible, for the same purpose, to extend the abutment 50 by means of a tongue 55 engaged beneath the rail flange P.

A rail R which is subjected to relatively low forces may be fitted with sheaths 53 on both sides. However, if the risk of lateral displacement is large, then sheaths 54 should be disposed on both sides of each rail.

Figure 8:
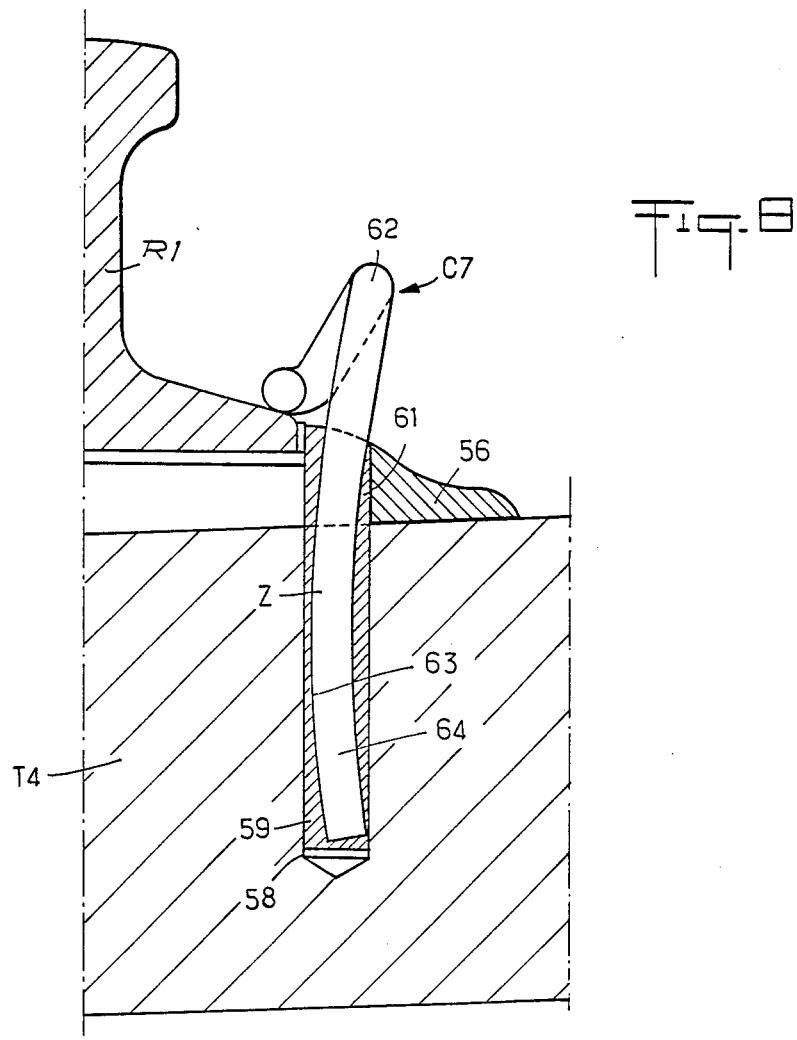
FIGS. 8 and 9 show a variant of the FIG. 6 system applicable to wooden ties, shown in cross-section and in plan view.
Figure 9:
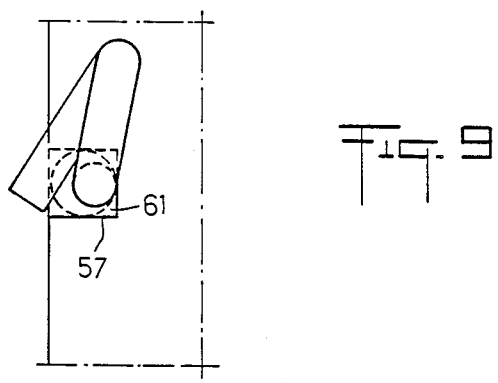

The rails may advantageously be fixed to wooden sleepers using the system shown in FIGS. 8 and 9.

The sole plate 56 interposed between the rail R and its support $T_4$ is pierced by a square hole 57. A round hole 58 is drilled in the wood in line with the square hole 57 and is perpendicular to the top face of the rail support $T_4$.

The sheath 59 containing the spike $C_7$ has a square collar 61. It is thrust into the hole 58 with its square collar 61 being received in the square hole 57 of the sole plate 56.

The rail R is placed on the sole plate 56 after the head 62 has been rotated out of the way. Thereafter the head 62 is moved back over the flange of the rail R. The sheath 59 with its toroidal cavity 63 and the spike $C_7$ with its toroidal shaft 64 of the same size as the cavity operate in the same way as the spikes $C_5$ and $C_6$. Naturally, the various different types of spike $C_5$, $C_6$, and $C_7$ may be mounted on both sides of a given rail.

Figure 10:
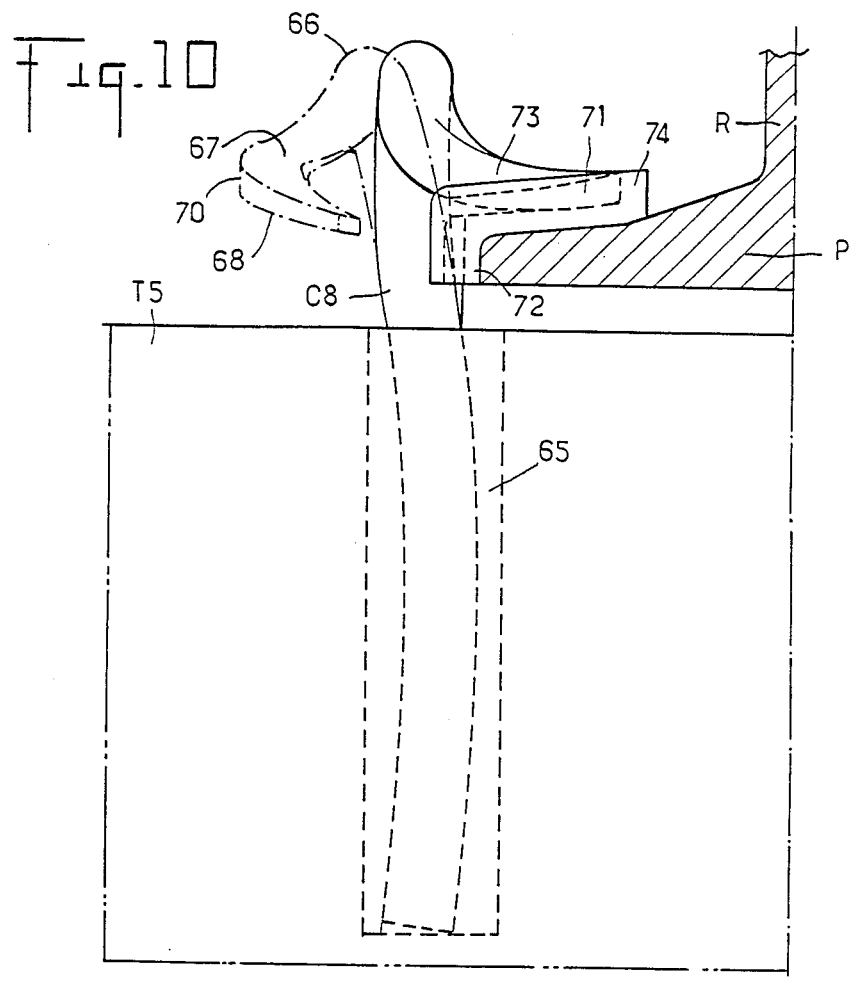
FIGS. 10 and 11 show a variant of the system shown in FIGS. 6 and 7.
Figure 11:
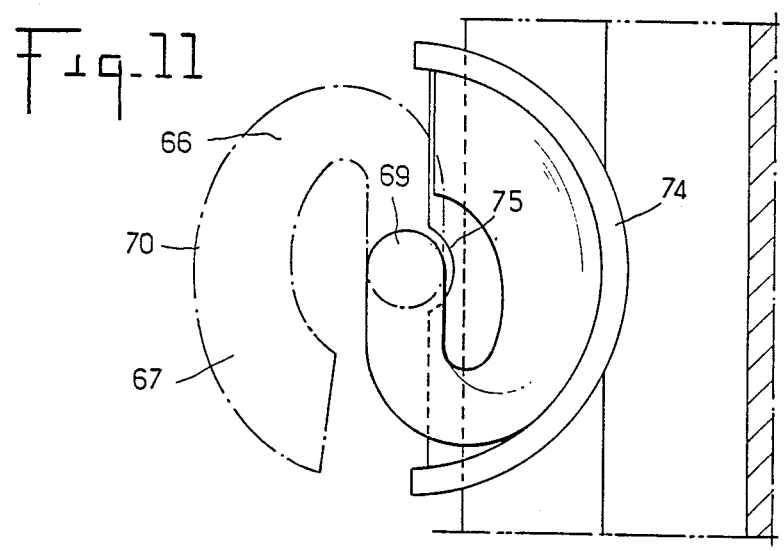

Another way of holding a rail which is subjected to a high degree of sideways force is described with reference to FIGS. 10 and 11.

Spikes $C_8$ fitted in sheaths 65 are implanted on both sides of a rail R in the rail support $T_5$. The heads 66 of the spikes face outwardly and are formed by respective flexible arms 67 each in the form of a variable pitch helical slope 68 extending coaxially from the shaft 69 and having a low pitch spiral edge 70.

Once the rail R has been placed on its support $T_5$ between the spikes $C_8$, a shoe 71 is placed on the flange P and is brought into abutment thereagainst by a heel 72. It has a plane or helical bearing surface 73 surrounded by a semicircular margin 74.

The shoe 71 is positioned retative to the shaft 69 of the spike $C_8$ to leave clearance by means of a notch 75 formed in the heel 72.

A couple is exerted on the head of the spike $C_8$ which is sufficient to rotate it and move it over the shoe 71.

The branch 67 making contact with the heel 72 bends and comes into contact with the bearing surface 73 along the helical slope 68 which flattens, and in contact with the margin 74 along the edge 70 which becomes circular.

Thereafter, by virtue of its elasticity, the branch exerts both a vertical force and a lateral force on the rail.

Should it move in any way, the rail is always returned to its equilibrium position. Should rail displacement tend to exceed a certain limit, the bottom of the notch 57 bears against the shaft 69 of the spike $C_8$ which then acts as a limited abutment on lateral displacement of the rail R.

Naturally, the invention is not limited to the embodiments described and shown which are given purely by way of example. For example, the shapes of the heads and the tails of the spikes may be modified. Other shapes of head or other types of anchoring may be used in like manner to solve other rail fixing problems using spikes having a shaft imprisoned inside a rail support, which shaft is deformed plastically.

In addition, the invention applies to any railroad, although it is more specially suitable for railroads having rails which are fixed to wooden or concrete ties either with or without sole plates, or else which are fixed to concrete slabs.

I claim:

1. A method of fixing a rail on a rail-support by means of metal spikes comprising:
   providing a spike having a shaft with a bottom portion and a top end terminated by a head for bearing against a rail flange, the bottom portion of said shaft including at least one zone made of a plastically deformable material, and having antirotation means for co-operating with complementary means of the rail support for preventing any relative rotation of said bottom portion relative to the rail support when a couple below a predetermined value is applied to the top portion of the spike;
   placing at least the bottom portion of said spike shaft in the rail-support;
   placing the rail on its support in the position in which it is to be fixed; and
   thereafter applying a sufficient twisting couple to said plastically deformable zone via the top portion of the spike to bring said head over the rail flange by plastic deformation in said zone.

2. The method according to claim 1, wherein the head of the spike initially bears against a portion of the rail bed, and the rail has a rail flange with a sloping top face, and wherein upon application of the twisting couple forces to the head of the spike, the head of the spike rises over the sloping top face of the rail flange.

3. The method according to claim 1, and further comprising providing a said spike wherein said plastically deformable zone is of a different hardness than that of the remainder of the spike.

4. A spike of fixing a rail on a rail-support comprising a shaft having:
   a top portion terminated by a head for bearing against a rail flange,
   a bottom portion including at least one zone made of a plastically deformable material different from that of the rest of the spike outside said zone,
   wherein said zone constitutes a twisting means for permitting the head to be twisted relative to the bottom portion of the spike, and
   antirotation means at the bottom portion of said shaft for co-operating with complementary means in the rail support for preventing any relative rotation between said bottom portion and said rail support, when a couple below a predetermined value is applied to the top portion of said spike.

5. A system according to claim 4, wherein the remainder of the spike outside said zone comprises means for making said remainder of said spike less deformable than the spike in said zone.

6. A spike according to claim 4, wherein the antirotation means at the bottom portion of the spike shaft comprise a bottom portion of the spike shaft being curved.

7. A spike according to claim 6, wherein the spike is made of a metal which is sufficiently malleable to enable plastic deformation to be repeated without breakage.

8. A spike according to claim 6, wherein said head has a spiral edge.

9. A spike according to claim 6, and further comprising a rail having a flange, a shoe on said flange, and wherein said head bears against the shoe.

10. Apparatus according to claim 9, wherein said shoe includes a heel and a semicircular margin co-operating with the head for lateral positioning of the rail.

11. A spike according to claim 4, wherein said head comprises a wide lug for engaging a substantially large area of the rail flange to distribute force thereover.

12. A spike according to claim 11, wherein said lug is relatively thick adjacent to the shaft and relatively thin spaced from the shaft.

13. A spike according to claim 4, said spike being of a spring steel, said zone of said bottom portion being annealed and said top portion being hardened.

14. A spike according to claim 4, and further comprising a loop connecting the head to the shaft.

15. A spike according to claim 4, wherein said head comprises a flexible arm having a helical slope of variable pitch extending coaxially with the shaft.

16. A spike according to claim 4, wherein said plastically deformable zone has a smaller right cross-section than the remainder of the spike.

17. A spike according to claim 16, wherein an enlargement is between the top portion of the shaft and said zone of smaller right cross-section.

18. A spike according to claim 4, and a rail-support, said spike being in said rail-support.

19. The apparatus of claim 18, and further comprising a sheath of electrically insulating material, said spike being in said sheath.

20. A spike according to claim 4, and further comprising a rail-support having a top face and curved cavities therein, sheaths in said cavities, a rail on said rail-support, the shafts of said spikes being in said sheaths and projecting from the top face of said rail support close to the rail, said shafts being curved and extending into said curved cavities.

21. Apparatus according to claim 20, wherein said sheath is a cylinder.

22. Apparatus according to claim 20, wherein the sheath is circular in transverse section.

23. Apparatus according to claim 20, wherein said sheath is oblong in transverse section.

24. Apparatus according to claim 20, wherein said sheath projects beyond said rail-support and forms a lateral abutment for the rail.

25. Apparatus according to claim 20, wherein said sheath has a square collar.

26. Apparatus according to claim 20, wherein said rail-support has a bottom face and the cavity of said sheath extends to said bottom face of the rail-support.

27. Apparatus according to claim 20, wherein said sheath is made of synthetic plastic material.

28. Apparatus according to claim 20, wherein each said cavity is perpendicular to the top face of the rail support.

* * * * *